United States Patent [19]

Harries et al.

[11] Patent Number: 5,236,251
[45] Date of Patent: Aug. 17, 1993

[54] VEHICLE BRAKING SYSTEMS

[75] Inventors: David A. Harries, Stratford upon Avon; Eric C. Hales, Solihull; William E. Haines, Southam; Kenneth M. Quinney, Kings Heath, all of England

[73] Assignee: Automotive Products, plc, Warwickshire, England

[21] Appl. No.: 688,542
[22] PCT Filed: Dec. 1, 1989
[86] PCT No.: PCT/GB89/01444
§ 371 Date: Jun. 10, 1991
§ 102(e) Date: Jun. 10, 1991
[87] PCT Pub. No.: WO90/06871
PCT Pub. Date: Jun. 28, 1990

[30] Foreign Application Priority Data

Dec. 15, 1988 [GB] United Kingdom ............ 8829317
Jun. 30, 1989 [GB] United Kingdom ............ 8915094
Oct. 30, 1989 [GB] United Kingdom ............ 8922240

[51] Int. Cl.⁵ .................... B60T 8/30; B60T 11/34
[52] U.S. Cl. .................... 303/9.69; 188/195; 188/349; 188/364; 303/22.1; 303/22.8; 303/9.75
[58] Field of Search ............ 303/9.62-9.75, 303/22.1, 22.5, 22.7, 22.8, 112; 188/349, 195, 181 T, 364, 363, 72.4, 370; 92/75

[56] References Cited

U.S. PATENT DOCUMENTS

| 3,002,791 | 10/1961 | Pease | 303/22.5 X |
|---|---|---|---|
| 3,101,220 | 8/1963 | Wettstein | 303/22.5 X |
| 3,338,351 | 8/1967 | Lepelletier | 303/22.5 X |
| 3,362,758 | 1/1968 | Goerke et al. | 303/9.69 |
| 3,627,387 | 12/1971 | Page et al. | 303/22.5 |
| 3,802,750 | 4/1974 | Kawai | 188/195 X |
| 4,251,116 | 2/1981 | Young | 303/22.7 |
| 4,415,209 | 11/1983 | Schopper | 188/364 X |
| 4,449,757 | 5/1984 | Rath et al. | 188/364 X |
| 4,553,471 | 11/1985 | Brademeyer | 188/364 X |
| 4,781,276 | 11/1988 | Berisch et al. | 188/364 X |
| 4,781,420 | 11/1988 | Yamakoshi | 188/195 X |
| 4,824,180 | 4/1989 | Levrai | |
| 5,150,772 | 9/1992 | Pantale et al. | 188/370 X |

FOREIGN PATENT DOCUMENTS

| 0283328 | 9/1988 | European Pat. Off. . |
|---|---|---|
| 3027143 | 2/1981 | Fed. Rep. of Germany . |
| 3109020 | 10/1982 | Fed. Rep. of Germany . |
| 1360523 | 3/1964 | France . |
| 2237788 | 2/1975 | France . |
| 2241431 | 3/1975 | France . |
| 1484723 | 9/1977 | United Kingdom . |
| 2082678 | 3/1982 | United Kingdom . |

Primary Examiner—Douglas C. Butler
Attorney, Agent, or Firm—Paul E. Milliken

[57] ABSTRACT

A vehicle braking system has a master cylinder, a first brake associated with a front wheel of the vehicle and a second brake (11) associated with a rear wheel of the vehicle, the master cylinder being connected to the first and second brakes in a common circuit. The second brake includes brake actuator (10) with a valve (30, 35) which will vary the rate at which fluid pressure is applied to the brake actuator (10) at a predetermined brake pressure, a spring loaded lever (50) acts on the valve (30, 35) to set the predetermined pressure at which the rate of application of pressure is varied and a linkage mechanism (70) varies to loading of the lever (50) to vary the predetermined pressure in proportion to the load applied to the rear wheel with which the brake (11) is associated.

8 Claims, 7 Drawing Sheets

VEHICLE BRAKING SYSTEMS

The present invention relates to vehicle braking systems and in particular to vehicle braking systems in which at least one brake actuator associated with a front wheel of the vehicle and at least one brake actuator associated with a rear wheel of the vehicle are connected in a common circuit of the braking system.

Because of weight transfer from the rear wheels to the front wheels of a vehicle during braking, if the same braking effort is applied to the front and rear brakes, the rear brakes will be liable to lock, traction of the rear wheels reducing as the weight is transferred to the front wheels. One solution to this problem is to provide a proportioning valve between the brake master cylinder and rear brake actuator, which at a predetermined pressure in the brake circuit will reduce the rate at which pressure is applied to the rear brake actuator. In a further refinement, the pressure at which the proportioning valve starts to reduce pressure to the rear brake actuator may be varied by applying a load to the valve which is proportional to the travel of the rear axle, so that as weight distribution to the rear wheel decreases, the pressure in the brake circuit at which the rate at which pressure to the rear brake actuator is reduced, will also decrease.

Hitherto, axle load responsive proportioning valves of this type have been mounted on a fixed chassis member remote from the brake actuator and controlled by a lever mechanism associated with the rear axle.

The present invention provides a wheel load responsive valve means which is integral with the brake actuator.

According to one aspect of the present invention, a vehicle braking system comprises a master cylinder, a first brake associated with a front wheel of the vehicle and a second brake associated with a rear wheel of the vehicle, said brakes being connected in a common circuit to said master cylinder, characterised in that the second brake includes an actuator with integral valve means which, at a predetermined fluid pressure in the brake circuit, will vary the rate at which fluid pressure is applied to the second brake actuator, resilient loading means acting upon said valve means to set the predetermined fluid pressure at which the rate at which fluid pressure is applied to the second brake actuator is varied, means being provided to vary the load applied by said resilient loading means in proportion to the load applied to the rear wheel with which the brake actuator is associated.

The brake actuator associated with the rear wheel may have two cylinder/piston assemblies, while the valve may control the rate at which pressure is applied to both cylinders, preferably one cylinder is connected directly to the brake circuit.

According to a preferred embodiment of the present invention a vehicle braking system comprises a master cylinder, a first brake associated with a front wheel of the vehicle and a second brake associated with a rear wheel of the vehicle, said brakes being connected in a common circuit to said master cylinder, characterised in that said second brake includes an actuator with two cylinder/piston assemblies, one cylinder being connected directly to the brake circuit and the other cylinder being connected to the brake circuit via valve means which, at a predetermined fluid pressure in the brake circuit, will vary the rate at which fluid pressure is applied to said other cylinder, resilient loading means acting upon said valve means to set the predetermined fluid pressure at which the rate at which fluid pressure is applied to the second brake actuator is varied, means being provided to vary the load applied by said resilient loading means in proportion to the load applied to the rear wheel with which the brake actuator is associated.

Various embodiments of the invention are now described, by way of example only, with reference to the accompanying drawings in which.

Figures 1, 2, 4:
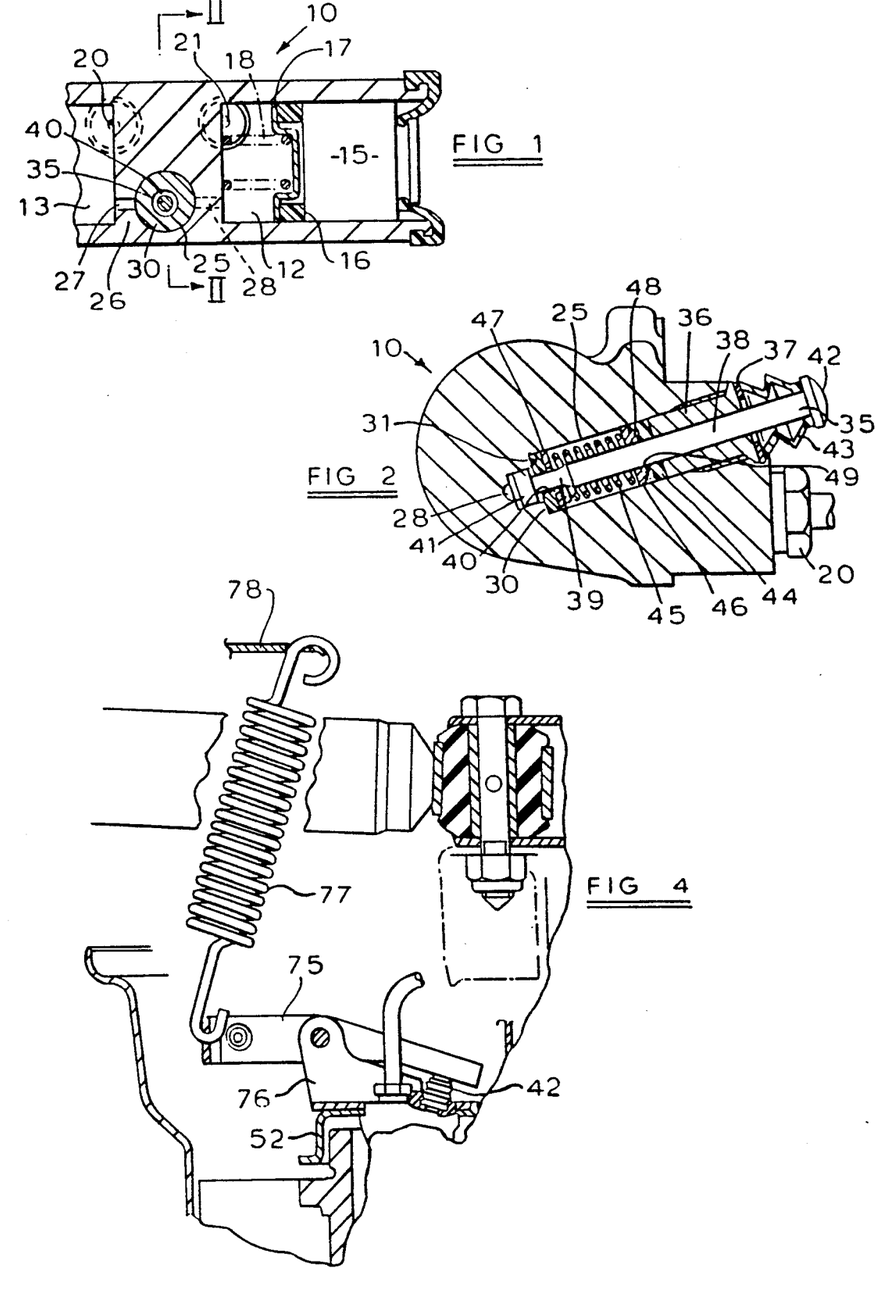
FIG. 1 illustrates the wheel cylinder assembly of a rear drum brake of a braking system according to the present invention.
FIG. 2 is a sectional elevation along the line II—II of FIG. 1.
FIG. 4 illustrates an alternative form of linkage that may be used in the assembly illustrated in FIG. 3.
Figure 3:
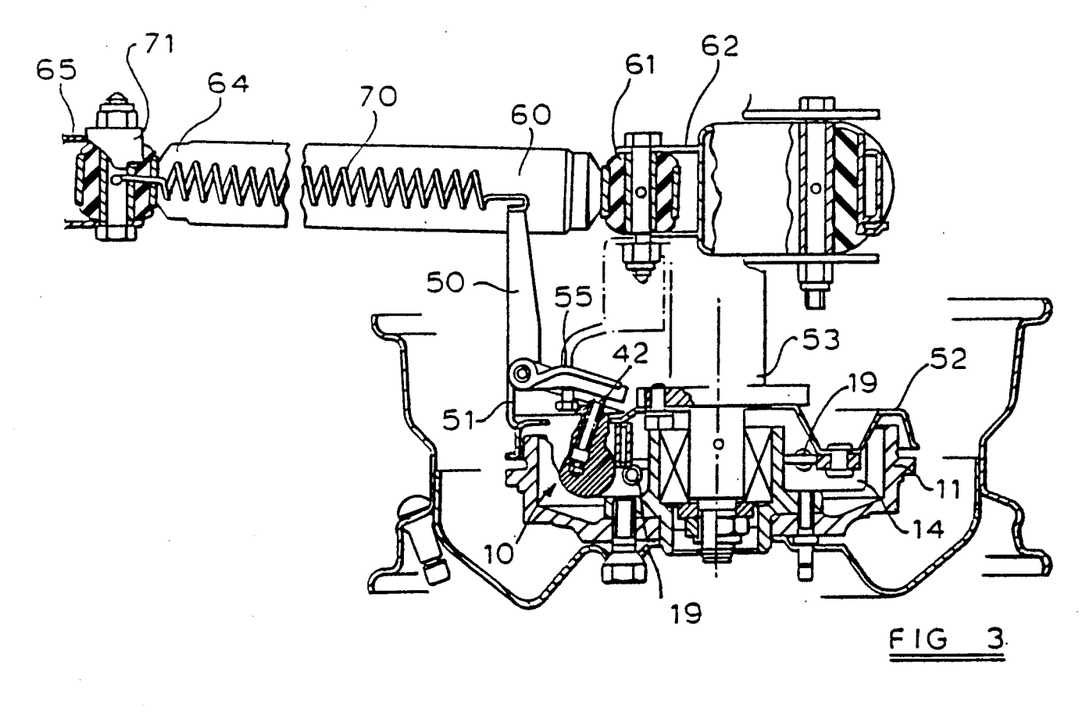
FIG. 3 illustrates a rear wheel axle assembly including a drum brake with the wheel cylinder illustrated in FIGS. 1 and 2.

FIGS. 1 and 2 illustrate a wheel cylinder assembly 10 for a drum brake 11 (as illustrated in FIG. 3). The wheel cylinder assembly 10 defines two cylinders 12 and 13, cylinder 12 controlling the leading shoe 14 of drum brake 11 and cylinder 13 the trailing shoe 14a (not shown in FIG. 3 but shown in FIG. 6). Pistons 15 (only one shown in FIG. 1) are slidingly located in the cylinders 12 and 13, the pistons 15 being sealed with respect to cylinders 12 and 13 by sealing rings 16 which are urged into engagement with the inside end of pistons 15, by plates 17 which are loaded by springs 18. The outer ends of pistons 15 engage the brake shoes 14 and 14a as shown in FIG. 6 and are urged towards one another by return springs 19 shown in FIG. 1 which act between the brake shoes in known manner.

Figures 6, 7:
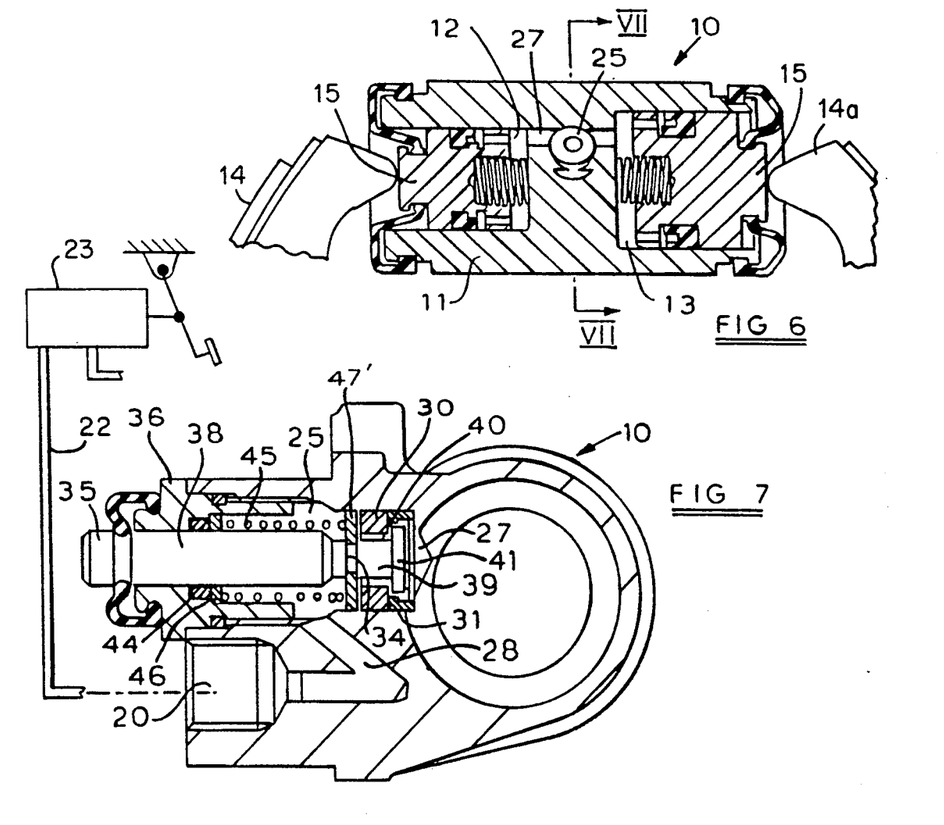
FIG. 6 illustrates a modification to the wheel cylinder illustrated in FIG. 1.
FIG. 7 is a sectional elevation along the line VII—VII of FIG. 6.

An inlet 20 is provided to the wheel cylinder assembly 10 by means of which it may be connected to the master cylinder of the brake system similar to the master cylinder 23 in FIG. 7. Inlet 20 opens directly into the cylinder 13 of the wheel cylinder assembly 10 and a bleed valve 21 opens into cylinder 12.

A valve bore 25 is provided in the wall 26 separating cylinders 12 and 13. The bore 25 is closed at one end, the closed end being connected to cylinder 12 by means of a passage 27. A second passage 28 connects bore 25 to cylinder 13 at a position spaced axially from the passage 27. The bore 25 is stepped intermediate of passages 27 and 28 and a valve seat 30 is slidingly located in the bore 25, so that it will normally seat against the shoulder 31.

A plunger 35 is slidingly located in a bearing 36 which is located in the open end of the bore 25 and is retained therein by a circlip 37. The plunger 35 is stepped having a main body portion 38 which is slidingly located in the bearing 36, an intermediate reduced diameter portion 39 which extends through a control port 40 defined by the valve seat 30, and an enlarged diameter end portion 41 which is of greater diameter than the control port 40 and the main body portion 38. A head formation 42 is provided at the outer end of plunger 35 and a rubber bellows unit 43 extends between the plunger 35 and the wheel cylinder housing to prevent ingress of dirt. A seal 44 is also provided adjacent the inner end of bearing 36 and a spring 45 acts between a ring 46 abutting the seal 44 and a washer 47 abutting seat 30 to urge the seal 44 into engagement with the bearing 36 and the seat 30 into engagement with the shoulder 31. The ring 46 has an annular formation 48 which engages seal 44 and urges the inner lip formation 49 thereof into sealing engagement with plunger 35.

As illustrated in FIG. 3 and described in greater detail below, a spring loaded lever 50 acts against the head formation 42 of plunger 35, urging the end portion 41 into engagement with the closed end of bore 25, in which position, end portion 41 will be clear of the valve seat 30.

Figure 5:
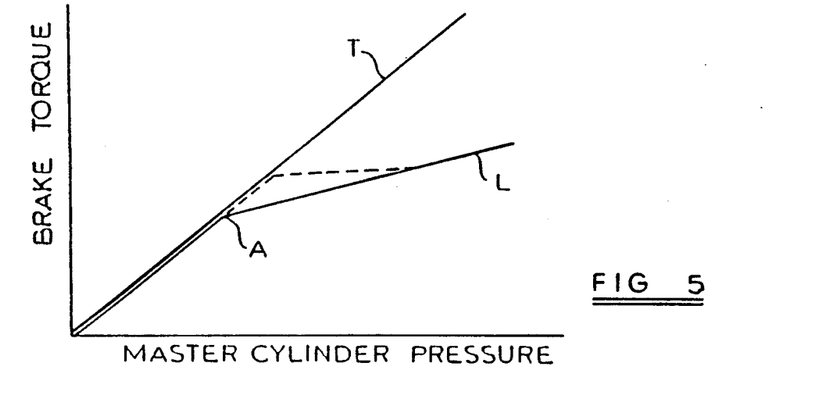
FIG. 5 shows typical plots of brake torque against master cylinder pressure for the leading shoe (L) and trailing shoe (T) of the drum brake illustrated in FIG. 1.

When the brake is applied, fluid under pressure from the master cylinder will flow through inlet 20 into cylinder 13 and through passage 27, bore 25, past the open control port 40 and through the passage 28 into cylinder 12. Fluid pressure in the cylinders 12 and 13 will thus initially increase at the same rate, forcing pistons 15 apart to move the brake shoes into engagement with the brake drum 46, as illustrated in FIG. 5.

As pressure of fluid increases, because of the difference in diameters of portions 38 and 41 of plunger 35, a force will be applied to the plunger 35 urging it against the load applied by the spring loaded lever 50. When the fluid pressure has reached a predetermined value, point A in FIG. 5, the load applied by fluid pressure acting on the plunger 35 will exceed that applied by the spring loaded lever 50 and the plunger 35 will move to the right, as illustrated in FIG. 2, the end portion 41 closing the control port 40, so that further increase in fluid pressure to the cylinder 12 is interrupted. Continued increase in fluid pressure from the master cylinder will continue to be applied directly to the cylinder 13 and by the piston 15 to the trailing brake shoe. However, because of the area differential of portions 41 and 38 of plunger 35, the pressure to cylinder 12 will increase at a slower rate than the pressure from the master cylinder, this rate being a function of the difference in cross sectional areas of portions 38 and 41 of the plunger 35.

When the brake is released and the pressure of fluid from the master cylinder reduces, excess pressure in cylinder 12 will move valve seat 30 against the load applied by spring 45, thus opening the control port 40 so that fluid can flow out of cylinder 12 thus releasing the leading brake shoe 14.

As illustrated in FIG. 3, the lever 50 is pivotally mounted on a bracket 51 which is secured with the backing plate 52 of brake 11, to the rear axle housing 53 of the vehicle. A spring 55 acts between the lever 50 and bracket 51 to urge the lever 50 into engagement with the head formation 42 of plunger 35. The other end of lever 50 extends over the trailing arm 60 of the vehicle suspension, which is pivotally connected at one end 61 to a bracket 62 mounted on the axle housing 53 and at the other end 64 to a bracket 65 mounted on a fixed chassis member of the vehicle. A tension spring 70 is connected between the lever 50 and a bracket 71 which is secured to the bracket 65, the spring 70 engaging bracket 71 at a position spaced from the pivotal connection of the trailing arm 60 to bracket 65.

The effective spring load applied to the plunger 35 is consequently the load applied by spring 55 minus that applied by spring 70. As load on the rear axle reduces and the chassis moves upwardly relative to the axle, spring 70 is stretched so that load applied on lever 50 by spring 70 increases, the load applied to the plunger 35 being correspondingly decreased. This reduction in load applied to the plunger 35 will reduce the pressure at which portion 41 of plunger 35 engages the valve seat 30. In this manner, as the load reduces on the rear wheels and traction between those wheels and the road surface decreases, the pressure at which the rate of increase in braking effort applied to the rear brakes is reduced, is reduced accordingly.

In the modification illustrated in FIG. 4, a lever 75 is pivotally connected to a bracket 76 mounted with the backing plate 52 to the axle housing 53, so that one end of the lever engages the head formation 42 of plunger 35. A tension spring 77 is connected between the other end of lever 75 and a bracket 78 attached to a fixed chassis member of the vehicle. In this embodiment, spring 77 provides the load applied to the plunger 35. Bracket 78 is positioned relative to the rear axle such that as the load on the rear axle reduces and the vehicle chassis moves upwardly relative to the axle, the spring 77 contracts thus reducing the load applied to the plunger 35 and the predetermined pressure at which the rate of increase in braking effort applied by the rear brakes is reduced.

As illustrated in broken line in FIG. 5, when master cylinder pressure is reduced, pressure in cylinder 12 will initially remain substantially constant until the pressure differential is sufficient to overcome the load applied to valve seat 30 by spring 45, when the seal between valve seat 30 and plunger 35 will be broken and fluid will flow from cylinder 12. The pressure in cylinder 13 which is connected directly to the master cylinder 23 will decrease with master cylinder pressure.

When the valve described above is used in a brake system with antilock control in which pressure in the brake circuit is reduced to reduce braking effort, if any of the wheels of the vehicle are liable to lock, the delay in reduction of braking effort of the leading shoe may result in the reaction time being prolonged so that the antilock operation does not prevent locking of the wheel, or excessive underbraking of the other wheels of the vehicle.

In the modification illustrated in FIGS. 6 and 7, the cylinder 13 controlling the trailing shoe 14a is of larger diameter than cylinder 12 which controls the leading shoe 14. As a result the proportion of brake effort applied by the trailing shoe to that applied by the leading shoe is increased.

Consequently if a proportioning valve controls flow of fluid from cylinder 13 to cylinder 12 in the manner described with reference to FIGS. 1 and 2, the effect of the delay in response of the leading shoe to decrease with master cylinder pressure on the overall performance of the brake, is diminished.

However, with brake actuators having cylinders 12 and 13 with different areas, the excessive load applied through the trailing shoes will distort the brake drum, moving it away from the larger diameter cylinder 13 and towards the smaller diameter cylinder 12. When the rate of increase in pressure to the smaller diameter cylinder 12 is reduced by the proportioning valve, the brake drum will be further deflected towards cylinder 12 causing pressure in cylinder 12 to be increased. As a result the reduced rate of increase of pressure in cylinder 12 is increased back up towards the direct rate of increase, thus significantly reducing the effect of the proportioning valve.

This problem is overcome by connecting both cylinders 12 and 13 to the brake circuit via a proportioning valve as illustrated in FIGS. 6 and 7. In this embodiment of the invention, passage 27 at the closed end of the valve bore 25 is connected to cylinders 12 and 13, while passage 28 is connected via inlet 20 to the brake circuit 22 and master cylinder 23. This proportioning valve also differs from that illustrated in FIGS. 1 and 2, in that the spring 45, which retains sealing ring 44 in position, acts between ring 46 and a circlip 47' which is retained in a recess 34 on the plunger 35. When the valve is closed, the seat 30 is maintained in sealing engagement with portion 41 of plunger 35 by the pressure differential between the brake circuit and cylinders 12 and 13 and will thus be free to open as soon as the pressures equalise, upon release of the brakes. Otherwise the proportioning valve is substantially identical to that illustrated in FIGS. 1 and 2 and will operate to reduce the rate of increase in pressure to both cylinders 12 and 13 once the brake pressure reaches a predetermined value which will depend on axle load.

As pressure in both cylinders 12 and 13 continues to rise at the same rate, there is no significant increase in deflection of the brake drum when the valve closes and consequently this problem is avoided. Reducing pressure to both cylinders 12 and 13 will introduce a delay in reduction of braking effort of the trailing shoe upon antilock operation. However, as the leading shoe contributes a far higher proportion to the overall braking effort, this delay in reduction of braking effort by the trailing shoe is insignificant. Furthermore, as the spring 41 no longer acts on seat 30 the hysteresis of the valve is significantly reduced, with consequent reduction in the delay on both leading and trailing shoe.

An alternative method of overcoming the problem of brake drum deflection when using a brake actuator with differential area cylinders, would be to apply brake pressure directly to the larger diameter cylinder controlling the trailing shoe, while applying brake pressure to the smaller diameter cylinder controlling the leading shoe through a compensating limit valve. With this arrangement while the limit valve will cut off the smaller diameter cylinder at a predetermined brake pressure, distortion of the brake drum will cause the pressure in the smaller diameter cylinder to increase at the required reduced rate.

Figure 8:
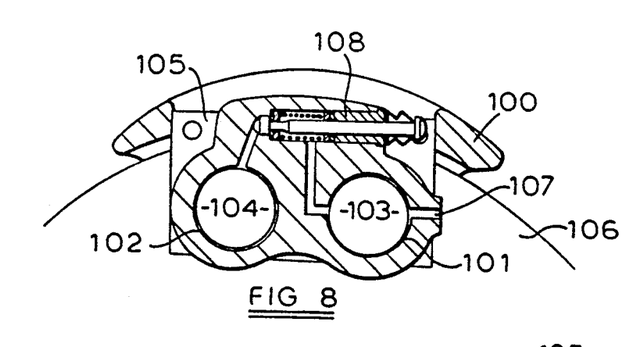
FIG. 8 illustrates the calliper of a rear disc brake of a brake system according to the present invention.

FIG. 8 illustrates a disc brake calliper 100 which includes a pair of cylinders 101, 102 in which pistons 103, 104 are slidably sealed, said pistons 103, 104 acting against a brake pad 105 to urge it into engagement with a brake disc 106, when the brakes are applied.

Cylinder 101 of calliper 100 is connected to the brake circuit by means of port 107. Cylinder 102 is connected to cylinder 101 via a proportioning valve 108 of the form described with reference to FIGS. 1 and 2.

With the calliper described above, the rate of increase in pressure to cylinder 101 will be the same as that to the associated front brake. However, at a predetermined pressure which is dependent on axle load, the rate of increase in pressure to cylinder 102 is reduced thus altering the balance between front and rear brakes. The diameters of cylinders 101 and 102 may be the same or one may be larger than the other to give the required variation in balance between front and rear brakes.

Figure 9:
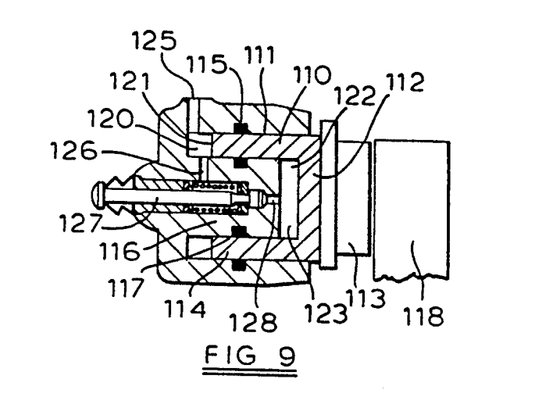
FIG. 9 illustrates an alternative form of calliper of a rear disc brake of a brake system according to the present invention.

In the calliper illustrated in FIG. 9 a piston 110 is slidably sealed within a closed cylinder 111. The piston 110 comprises a head portion 112 which extends from the open end of cylinder 111 and engages a brake pad 113. A cylindrical skirt formation 114 extends from the head portion 112 towards the closed end of cylinder 111 and is sealed with respect to the cylinder 111 by means of elastomeric ring 115.

A cylindrical formation 116 extends coaxially of cylinder 111 from the closed end thereof, into the skirt formation 114 of piston 110 and is sealed with respect thereto by means of elastomeric ring 117. The piston 110/cylinder 111 assembly thereby defines two working chambers; an annular chamber 120 which acts against the annular end wall 121 of skirt formation 114 and chamber 122 which acts against the face 123 of the head portion 112 remote from brake pad 113. Chamber 120 is connected to a brake circuit via port 125 and to chamber 122 via passage 126, proportioning valve 127 and passage 128. The proportioning valve 127 is identical in construction and operates in the same manner as the valve disclosed with reference to FIGS. 1 and 2.

As with the embodiment described with reference to FIGS. 1 and 2, when the brakes are applied, fluid under pressure will be supplied to chamber 120 and via passage 126, valve 127 and passage 128 to chamber 122 to apply a load to the piston 110 which will urge the brake pad 113 into engagement with brake disc 118. At a predetermined pressure which is dependent on the axle load, the valve 127 will reduce the rate at which fluid pressure increases in chamber 122 and thus the rate at which the load on pad 113 increases.

While in the embodiments illustrated in FIGS. 8 and 9 the pistons act on only one brake pad, the load thereon being transmitted by the calliper to a pad located on the other side of the brake disc, pistons may be provided on both sides of the calliper so that a load will be applied separately to each pad. With disc brakes of this type the proportioning valve may be provided between the piston on one side of the calliper and that on the other. Where individual pistons act on more than one brake pad or brake shoe in the case of drum brakes, these pads or shoes may be made of different size and/or of materials with different coefficient of friction.

Figure 10:
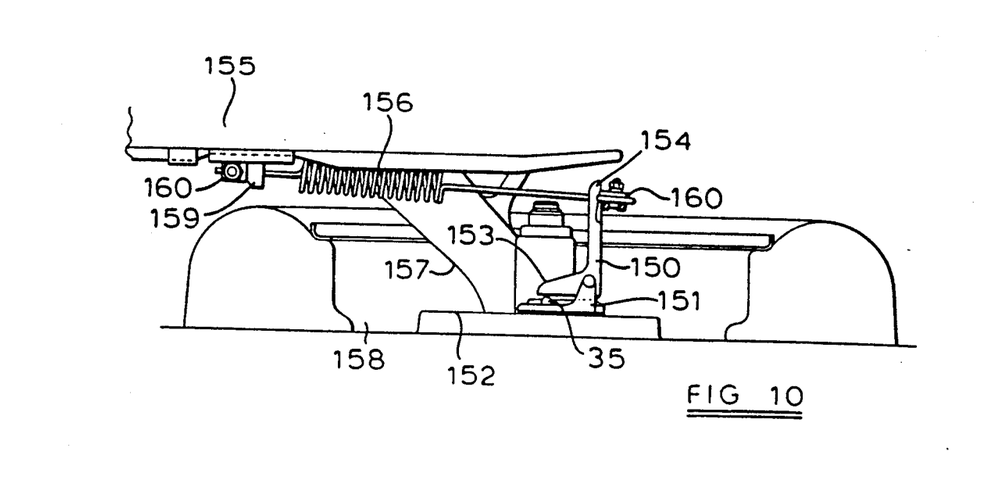
FIG. 10 illustrates a modification to the linkage illustrated in FIG. 3.

FIG. 10 illustrates an alternative mechanism for applying a resilient load to the plunger 35. A lever 150 is pivotally mounted on a bracket 151 which is secured to the backing plate 152 of the drum brake. One end 153 of the lever 150 engages the head 42 of plunger 35 and the other end 154 is connected to the vehicle sub-frame 155 by means of a tension spring 156. The tension spring 156 will thus apply a load to the plunger 35 which will vary as the brake drum and trailing arm 157 to which it is attached, move relative to the sub-frame 155. The mounting point of the spring 156 to the sub-frame 155 is located such that as the load on wheel 158 associated with the brake drum reduces and the wheel 158 moves downwardly relative to sub-frame 155, the length of spring 156 will decrease thus decreasing the load applied to the plunger 35. The spring 156 is connected to one or both of the sub-frame 155 and lever 150 by a straight portion which engages through a hole in the layer 150 and/or a bracket 159 mounted on the sub-frame 155. A collar 160 is then clamped on the straight portion of the spring 156 to provide an adjustable stop, by which extension of the spring 156 may be adjusted to set the resilient load applied to the plunger 35 for a standard wheel loading.

Figure 11:
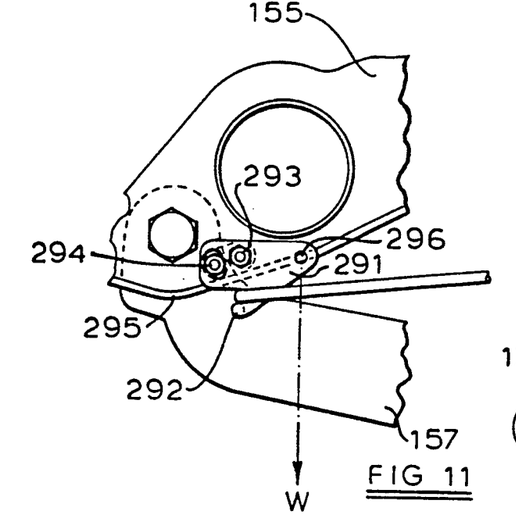
FIG. 11 illustrates in side elevation a further modification to the mechanism for resiliently loading the plunger of the brake actuator of a brake system in accordance with the present invention.

In the mechanism illustrated in FIG. 11, a lever 130 is pivotally mounted on bracket 131 which is secured on the backing plate 152 of the drum brake. A hook formation 133 on the lever 130 engages through an aperture 134 on the bracket 131 to provide a pivot, while the edge 135 of a cut-away defining the hook formation 133 is arranged to engage a flange 136 on bracket 131 to limit pivotal movement of the lever 130. A compression spring 137 is located between a projection 138 on lever 130 and a cap 139 which engages the plunger 35. A hook formation 140 on the spring 137 engages over projection 138 and a retaining ring 141 maintains the spring 137 in position.

The end 142 of lever 130 remote from the pivot is connected to a plate 291 mounted on the vehicle subframe 155 by means of rod 290, which is held under tension so as to partially compress the spring 137 and apply a load to the plunger 35. The plate 291 is mounted on sub-frame 155 by means of pivot 293, a pinch bolt 294 engaging through an arcuate hole 295 in plate 291, by means of which it may be clamped in position. The rod 290 is secured at one end to lever 130 by means, for example, of a snap retainer which locates in a rubber bush mounted in the end 142 of lever 130. A suitable formation on the other end of rod 290 engages a hook formation 292 on plate 291. The plate 291 may be adjusted to set a predetermined load on plunger 35 at a standard axle loading by hanging a setting weight W from hole 296 on plate 291 and clamping the plate 291 in the appropriate position by means of pinch bolt 294, lever 130 may alternatively be connected to the subframe 55 by other means of fixed length, for example a cable, with appropriate adjustment means.

Figure 12:
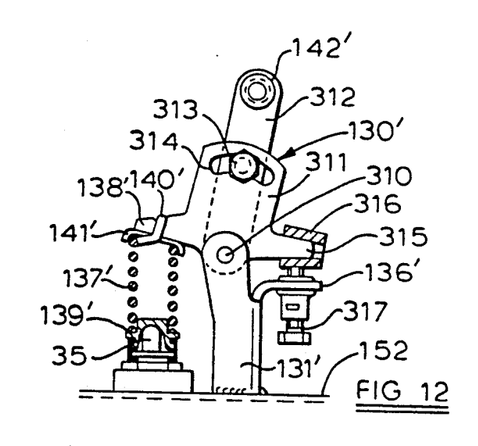
FIG. 12 illustrates in side elevation a modification to the mechanism illustrated in FIG. 11.

In the modification illustrated in FIG. 12, the lever 130' is formed from two plates 311 and 312 which are connected to the bracket 131' by common pivot 310. A pinch bolt 313 threadably engages plate 312 and extends through an arcuate hole 314 in plate 311. Plate 311 defines a formation 138' which serves to locate a spring assembly in engagement with plunger 35, as described above. The plate 311 also defines a stop formation 315, a plastic sleeve 316 being mounted on the stop formation 315. A setting screw 317 mounted on flange 136' of bracket 131' engages the plastic sleeve 316.

The plate 312 is connected to the vehicle subframe by a link of fixed length in suitable manner. With this modified embodiment the plunger 35 may be set to a predetermined load at a standard axle loading, by adjusting setting screw 317 to compress spring 137'. Slack in the link between plate 312 and the vehicle subframe may then be taken up by pivoting of plate 312, relative to plate 311, which may then be clamped together by pinch bolt 313.

In the mechanism illustrated in FIGS. 13 to 17, the vehicle sub-frame 155 comprises a pair of longitudinal members 200 which are interconnected by a tubular cross-member 201, to which they are welded. The subframe 155 is mounted to the vehicle at the opposite ends of each longitudinal member 200 by rubber mounting blocks.

Figure 13:
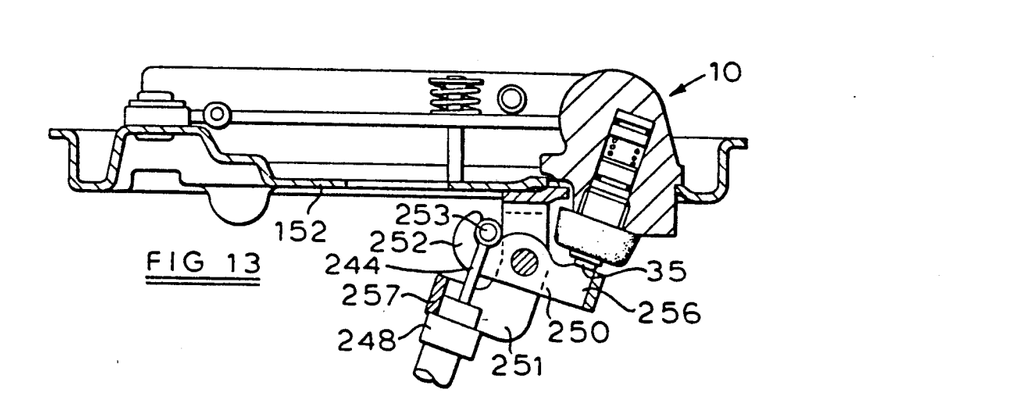
FIG. 13 illustrates in sectional side elevation a drum brake with cable mechanism for resiliently loading the plunger of the brake actuator of a brake system in accordance with the present invention.
Figure 14:
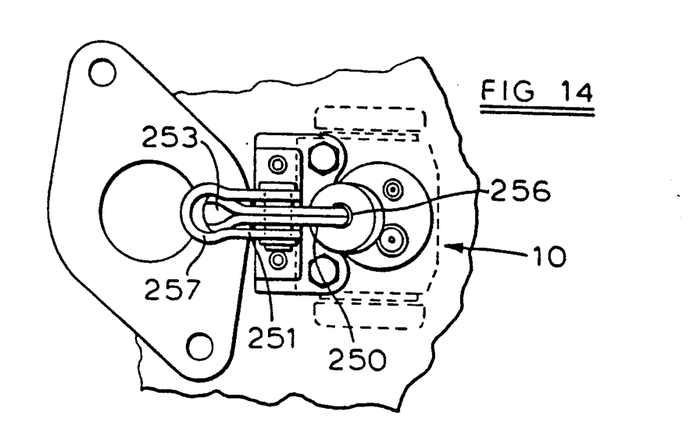
FIG. 14 is a partial plan view of the drum brake illustrated in FIG. 13.

A trailing arm 157 is pivotally mounted on each of the longitudinal members 200 about a common pivot axis 202. The outer ends of the trailing arms support the wheels 158 and associated drum brakes. The trailing arms 157 are interconnected by an anti-roll bar 203 which serves to reduce movement of one trailing arm 157 relative to the other and thus rolling of the vehicle.

Figure 15:
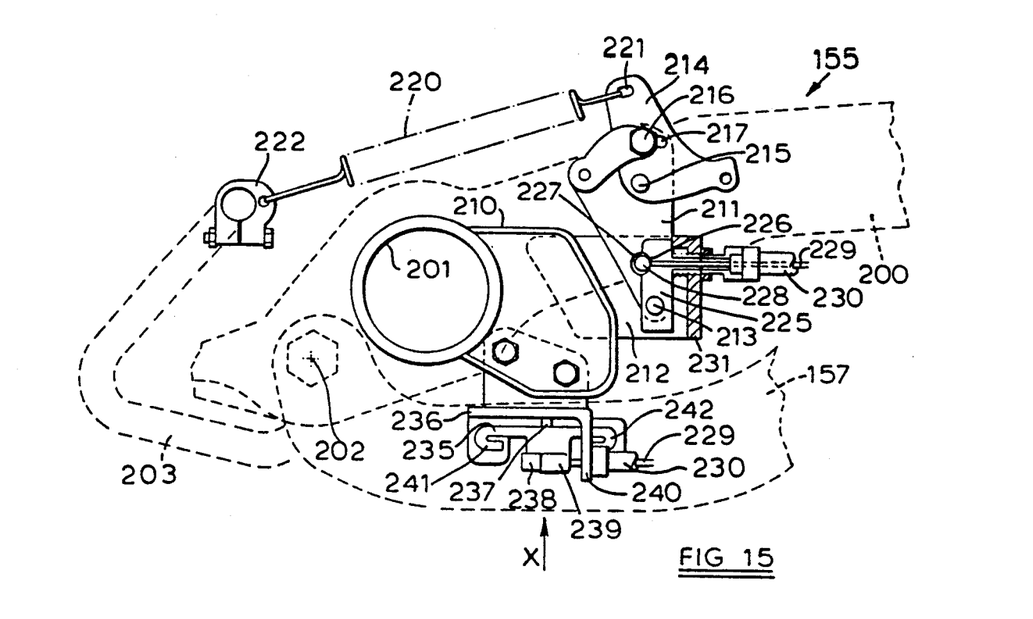
FIG. 15 illustrates in side elevation a mechanism for operating the cable mechanism illustrated in FIGS. 13 and 14.
Figure 16:
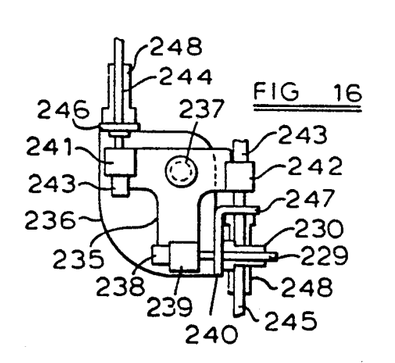
FIG. 16 is a partial view in the direction of arrow X in FIG. 15.

As illustrated in FIG. 15, a bracket 210 is welded to the tubular cross-member 201 intermediate of longitudinal members 200. A lever 211 is pivotally mounted by pivot 213 to a plate 212, the plate being secured to the bracket 210. A setting plate 214 is pivotally mounted on lever 211 by pivot 215 and a pinch bolt 216 locates through an arcuate hole 217 in the setting plate 214. One end of a tension spring 220 engages a hole 221 in setting plate 214, the other end of the spring 220 being attached to the anti-roll bar 203 by means of a clamp 222.

A cranked strip 225 is secured to the lever 211 to provide a bifurcated formation, a notch 226 being provided on one edge of strip 225 corresponding to a hole 227 in lever 211, for location of a barrel nipple 228 at one end of a Bowden cable 229. The outer case 230 of the Bowden cable 229 is adjustably located by means of a flange 231 on plate 212, in known manner.

The other end of Bowden cable 229 is connected to a swivel plate 235 mounted on a base plate 236 by pivot 237, the base plate 236 being attached to the bracket 210. A nipple 238 at said other end of the Bowden cable 229 engages a retaining formation 239 on swivel plate 235, the retaining formation 239 being displaced radially of the pivot 237. The outer case 230 of Bowden cable 229 abuts a lug 240 extending from the base plate 236.

Two further retaining formations 241 and 242 are provided on swivel plate 235 disposed diametrically of the pivot 237, by which nipples 243 of two further Bowden cables 244 and 245 may be secured to the swivel plate 235. Lugs 246 and 247 extending from the base plate 236 are provided for location of the outer cases 248 of cables 244 and 245.

As illustrated in FIGS. 13 and 14, the ends of each of the cables 244 and 245 remote from the swivel plate 235 are connected to a lever 250 which is pivotally mounted on a bracket 251 secured to the backing plate 152 of the drum brake associated with each of the rear wheels. The lever 250 has a bifurcated hook formation 252 at one end which is engaged by a barrel nipple 253 on the end of the associated Bowden cable 244, 245. The other end 256 of the lever 250 engages the plunger 35. A stop formation 257 on bracket 251 locates the outer casing 248 of the associated Bowden cable 244, 245.

With this assembly, as the trailing arms 157 move upwardly and downwardly under varying loads, the anti-roll bar 203 pivots round with the trailing arms 157, thus causing the spring 220 to be expanded and contracted respectively, thus increasing and decreasing the load on plunger 35 in response to axle loading. The load applied to the plunger 35 at a standard axle loading may be set using the setting plate 214, in the manner described with reference to FIG. 11.

Figure 17:
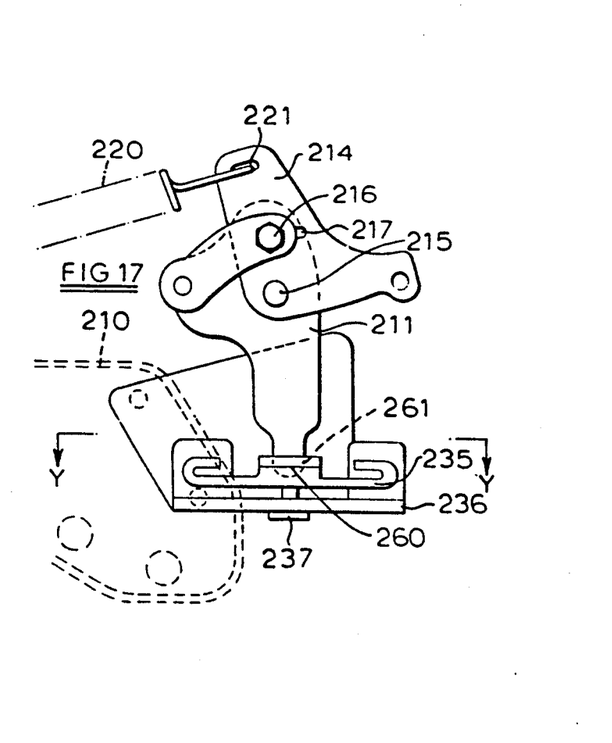
FIG. 17 illustrates a modification to the mechanism illustrated in FIG. 15.
Figure 18:
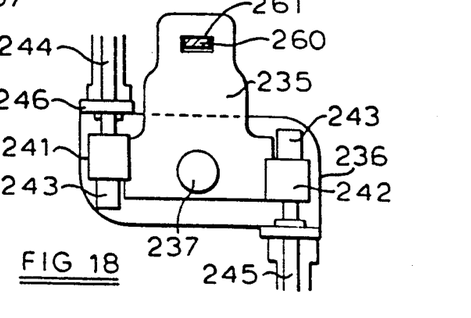
FIG. 18 is a section along the line Y—Y in FIG. 17.

In the modification illustrated in FIGS. 17 and 18, a lug 260 on lever 211 engages in a slot 261 in the swivel plate 235, said slot 261 being offset radially from the pivot 237. With this arrangement, pivoting of the lever 211 will be transmitted directly to the swivel plate 235 and from there to the levers 250 and plunger 35 by cables 244 and 245.

Figure 19:
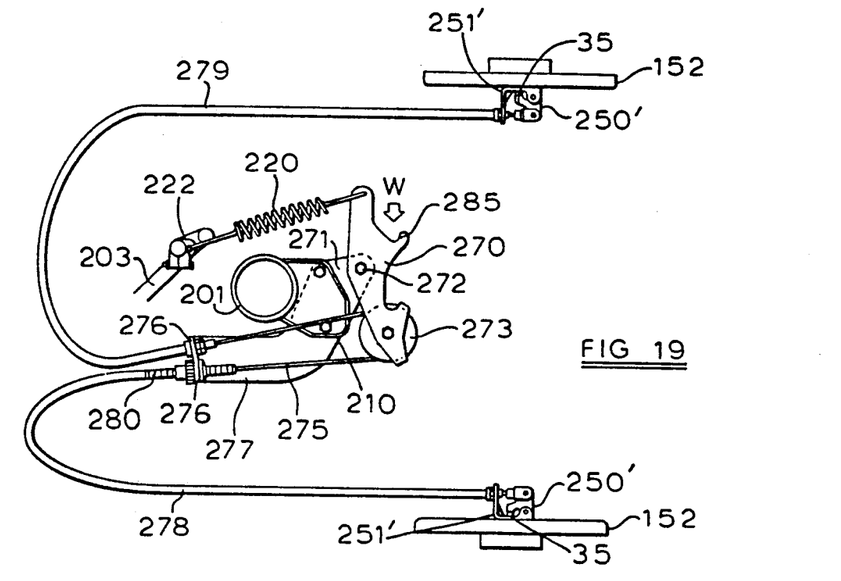
FIG. 19 illustrates a modification to the mechanism illustrated in FIG. 15.

In the modification illustrated in FIG. 19, a lever 270 is pivoted to plate 271 about a pivot 272, the plate 271 being secured to the bracket 210. The lever 270 is connected at one side of the pivot 272 to a clamp 222 on anti-roll bar 203 by means of tension spring 220. A pulley 273 is pivotally mounted to the lever 270 on the other side of the pivot 272. A cable 275 is mounted over the pulley 273, opposite ends of the cable 275 being connected to the levers 250' associated with the drum brakes on the opposite rear wheels of the vehicle.

The cable 275 passes through a pair of lugs 276 which are provided on a plate 277 secured to bracket 210. The lugs 276 serve to locate outer casing portions 278 and 279 which extend between the lugs 276 and the brackets 251' on each of the drum brake backing plates 152. Screw adjustment means 280 is provided on at least one of the outer casing portions 278.

Variation in the load applied by the spring 220 during suspension movement, will be transmitted to the plungers 35 associated with the two drum brakes, by cable 275. The pulley 273 will ensure that the load is applied equally to the plunger 35 associated with each of the brakes. The load applied to the plungers 35 may be set for a standard axle load by hanging a setting weight W on lever 270 by means of formation 285 and then taking up slack in the cable 275 by the screw adjustment means 280.

Figure 20:
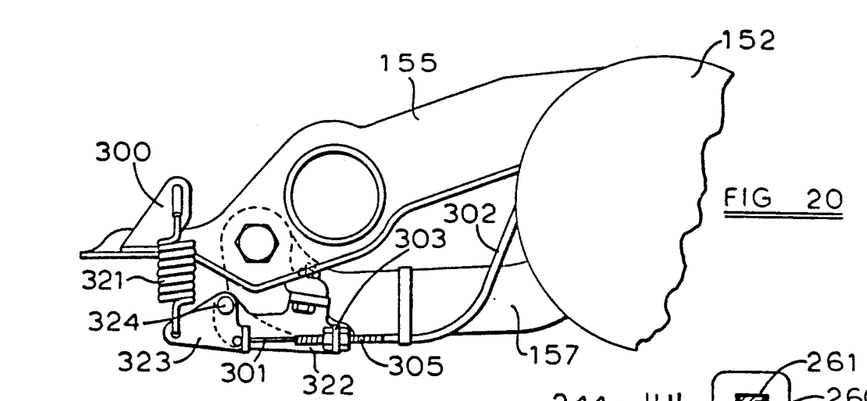
FIG. 20 illustrates in side elevation a further modification to the mechanism for resiliently loading the plunger of the brake actuator of a brake system in accordance with the present invention.
Figure 21:
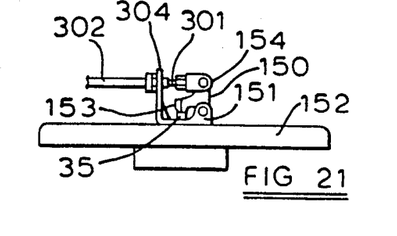
FIG. 21 is a side elevation of the backing plate of the brake associated with the mechanism illustrated in FIG. 20.

In the mechanism illustrated in FIGS. 20 and 21 a plate 323 is secured by pivot 324 to a bracket 322 secured to the trailing arm 157. The plate 323 is connected at a point remote from pivot 324 to a bracket 300 secured to the sub-frame 155, by means of tension spring 321. The plate 323 is connected to lever 150 mounted on the backing plate 152 of the associated drum brake by means of a Bowden cable 301. The outer case 302 of the Bowden cable 301 is located between a lug 303 on bracket 322 and a lug 304 on bracket 151 which is attached to backing plate 152. Screw adjusting means 305 of conventional design is provided at the end of casing 302 which engages lug 303.

With this mechanism, as the suspension and wheel 158 move upwardly and downwardly relative to sub-frame 155, movement of the trailing arm 157 will cause spring 321 to expand or contract and the resulting variation in the load applied by the spring 321 is transmitted to the plunger 35 via plate 323, cable 301 and lever 150.

In order to adjust this mechanism to produce a predetermined load on plunger 35 at a standard axle loading, a setting weight is hung from plate 323 in similar manner to that described above. Slack in the cable 301 is then taken up by the screw adjustment means 305.

While the above embodiments relate to proportioning valves, the invention is equally applicable to limit valves which are a particular form of proportioning valve in which the reduced rate of application of braking effort is zero. This is achieved by making the plunger area of the valve equal to or greater than the seating area, so that any excess in master cylinder pressure will apply zero load to the plunger or a load in the same direction as that applied by pressure of fluid in the brake actuator.

Also while in the above embodiments helical tension of compression springs are used to load the valve, other forms of spring, for example leaf springs, may be used.

We claim:

1. A hydraulic braking system for a vehicle comprising a master cylinder for generating fluid pressure, a first brake associated with a front wheel of the vehicle and a second brake associated with a rear wheel of the vehicle, said brakes being connected in a common circuit to said master cylinder, the second brake including a wheel cylinder assembly having a first wheel brake cylinder with a first piston therein, and having a fluid inlet for connection to said circuit, a first fluid passageway between the inlet and said first wheel brake cylinder and valve means arranged within the wheel cylinder assembly in said first fluid passageway, said valve means being operable to vary the fluid pressure supplied to the wheel brake cylinder at a lower rate than the increase in master cylinder generated pressure when a predetermined fluid pressure in the common circuit has been reached, resilient loading means applying a first load upon said valve means to set said predetermined fluid pressure, and further loading means applying a further load to said valve means, said further load being in proportion to a vehicle load applied to the said rear wheel with which the second brake is associated.

2. A vehicle braking system according to claim 1 characterised in that the wheel brake cylinder assembly further includes a second wheel brake cylinder having a second piston therein, fluid passageways including said first passageway connecting said first and second wheel brake cylinders to the common circuit via said valve means, said valve means varying said rate at which fluid pressure is applied to said first and second wheel brake cylinders.

3. A vehicle braking system according to claim 2 in which the wheel brake cylinder assembly is for use on a leading/trailing drum brake assembly, wherein the first piston in use actuates a leading brake shoe, and said second piston in use actuates a trailing brake shoe wherein said second piston is of larger diameter than said first piston.

4. A vehicle braking system according to claim 1 characterised in that said valve means is located in a bore within the wheel cylinder assembly, said bore having an open end and a closed end, said fluid passageway comprising a first passage being provided from the closed end of said bore to an operating chamber of the wheel cylinder and a second passage being provided to said bore from the fluid inlet, the second passage being spaced axially from the closed end of the bore, a valve seat being slidingly located in the bore intermediate the first and second passages and resiliently loaded towards the first passage and a plunger received in the open end of said bore and moveable axially of the bore, said plunger having a body portion which passes with a clearance through a control port in the valve seat and an end portion of enlarged diameter which is positioned between the closed end of the bore and the valve seat, the plunger being movable between a first position in which the end portion is clear of the valve seat, and a second position in which the end portion engages the valve seat to close the control port, said resilient loading means and further loading means applying said first and further loads respectively to the plunger urging said plunger towards said first position.

5. A vehicle braking system as claimed in claim 4 characterised in that said open end of said bore is closed by a bearing in which said plunger is sealingly slideable.

6. A vehicle braking system according to claim 5 characterised in that said bearing has an axially inner end and seal means is provided against the axially inner end of the bearing to seal the plunger, a compression spring is provided between the seal means and the valve seat to resiliently load the valve seat towards the closed end of the bore, the bore being stepped to define a shoulder intermediate the first and second passages, and the compression spring urges the valve seat into engagement with said shoulder.

7. A vehicle braking system according to claim 1 wherein, said valve means has a plunger, and the resilient loading means comprises a spring loaded lever acting against the plunger, and said first load comprises a spring load applied by said lever, and said further loading means applies said further load to the plunger through the lever so that said spring load and further load in total vary with said vehicle load applied to said rear wheel.

8. A vehicle braking system according to claim 7 wherein said vehicle has a vehicle suspension and a vehicle subframe on a fixed chassis means of said vehicle characterised in that the lever is pivotally mounted in fixed relationship to the plunger, said resilient loading means comprising a compression spring acting between one end of the lever and the plunger, and said further loading means comprises a rod connecting the other end of the lever to a fixed point on said vehicle subframe, the separation between said point and the lever varying with the movement of said vehicle suspension, so that as said vehicle load applied to the rear wheel increases, said compression spring will be compressed by said further load applied through the rod to increase said spring load and said further load in total applied to the plunger.

* * * * *